United States Patent [19]

Wirth et al.

[11] 4,043,445

[45] Aug. 23, 1977

[54] CENTRIFUGAL ROTARY TRANSFER APPARATUS

[75] Inventors: Gary J. Wirth, Milwaukee; Kenneth M. Gelder, Germantown, both of Wis.

[73] Assignee: S.I. Handling Systems Inc., Easton, Pa.

[21] Appl. No.: 548,297

[22] Filed: Feb. 10, 1975

[51] Int. Cl.² .................................. B65G 37/00
[52] U.S. Cl. ........................... 198/611; 198/362; 198/642
[58] Field of Search .................. 198/25, 26, 128, 136, 198/209, 212, 38, 103; 221/277; 222/410; 214/11 R; 241/275; 209/120

[56] References Cited

U.S. PATENT DOCUMENTS

| | | | |
|---|---|---|---|
| 531,282 | 12/1894 | Solvay | 198/128 |
| 653,792 | 7/1900 | Dasconaguerre | 209/120 |
| 2,755,026 | 7/1956 | Woock | 198/209 |
| 3,044,599 | 7/1962 | Gajda et al. | 198/103 |
| 3,049,215 | 8/1962 | Hutter et al. | 198/103 |
| 3,140,771 | 7/1964 | Harrison et al. | 198/38 |
| 3,235,101 | 2/1966 | Milhaupt | 198/26 |
| 3,355,005 | 11/1967 | Craggs et al. | 198/209 |
| 3,698,537 | 10/1972 | Black et al. | 198/103 |
| 3,871,511 | 3/1975 | Wentz et al. | 198/103 |

FOREIGN PATENT DOCUMENTS

| | | | |
|---|---|---|---|
| 362,053 | 9/1921 | Germany | 198/128 |

Primary Examiner—Evon C. Blunk
Assistant Examiner—Joseph E. Valenza
Attorney, Agent, or Firm—Seidel, Gonda & Goldhammer

[57] ABSTRACT

A centrifugal rotary loader apparatus for a multiple tray conveyor includes a plurality of similar spirally-shaped, conical supporting surfaces, each having a radially extending pickup vane.

Each supporting surface includes an inner loading cone angle of 30° and an outer angle of 20° for a retail merchandise warehousing system.

An outer encircling guide wall has a discharge opening with a vertical trailing edge and an inclined leading edge. The load moves outwardly as a result of centrifugal forces through the opening.

The rotary loader is loaded perpendicular to the direction of rotation and the tray conveyor is located beneath the loader with the center line of the trays aligned with the periphery of the loader.

6 Claims, 4 Drawing Figures

U.S. Patent  Aug. 23, 1977  4,043,445
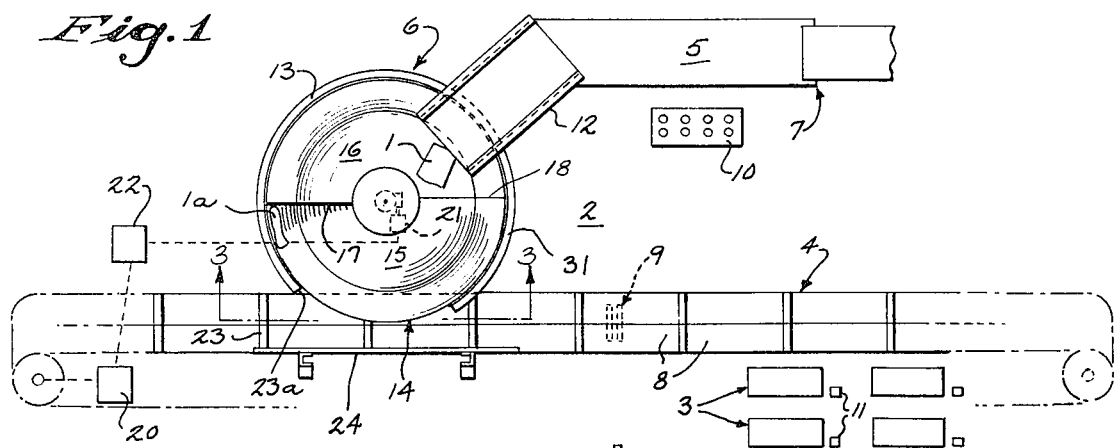
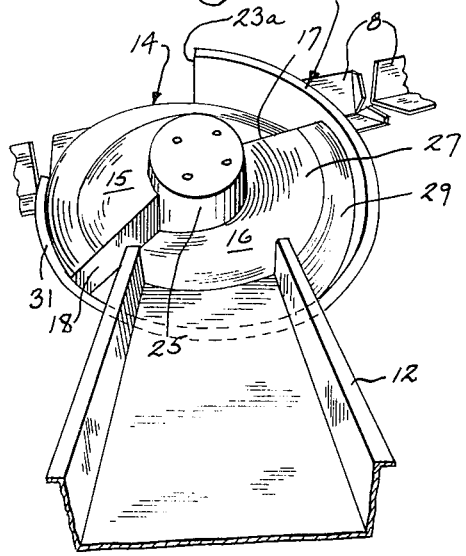
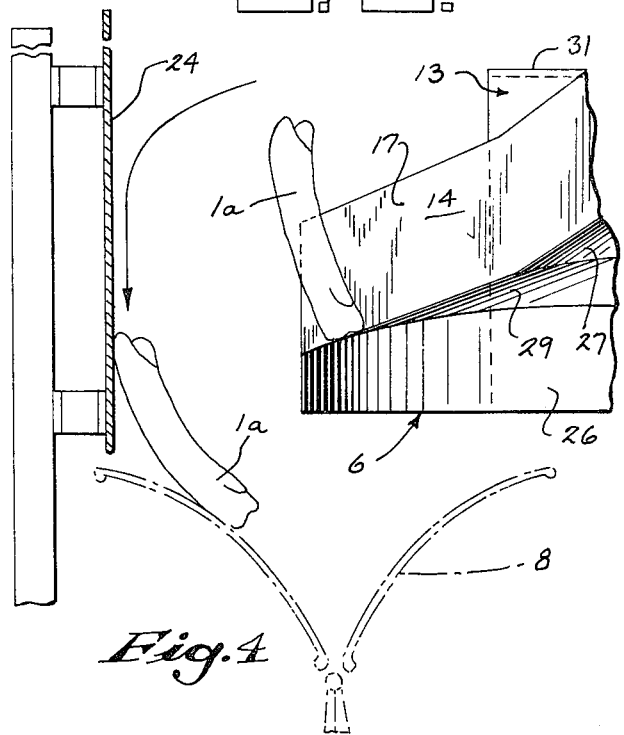
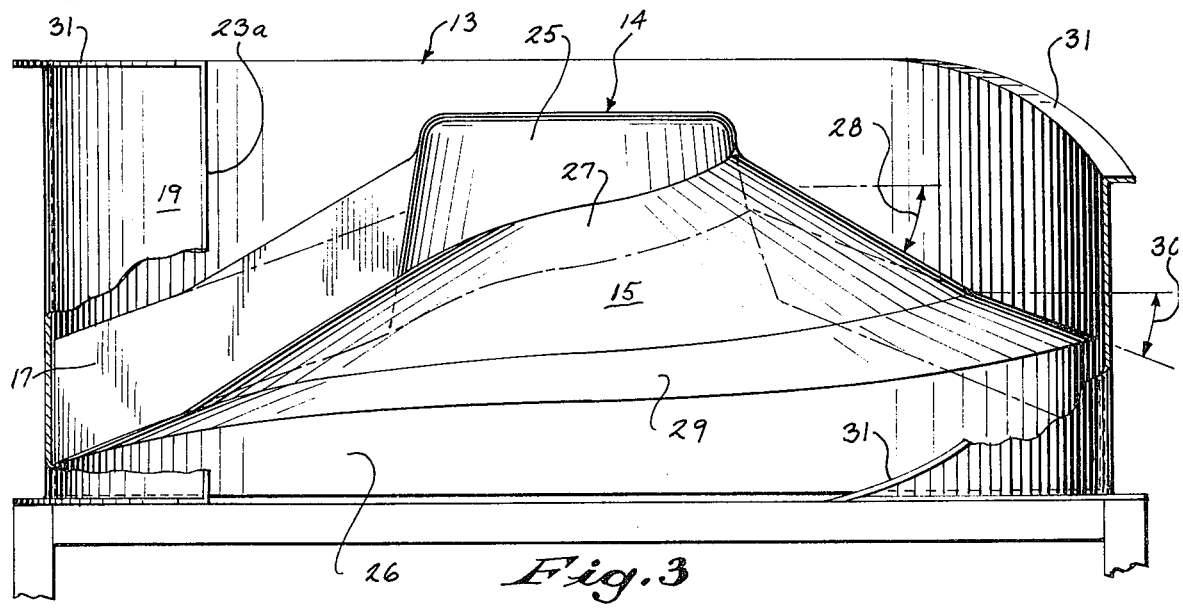

CENTRIFUGAL ROTARY TRANSFER APPARATUS

BACKGROUND OF THE INVENTION

This invention relates to a centrifugal loading apparatus and particularly to such an apparatus for selectively depositing of sequentially received loads upon predetermined portions of a conveying system for sorting of the loads.

In the development of automatic material and article handling, high speed conveying and sorting mechanisms have been developed to transfer loads from a loading station to various receiving stations. A particularly satisfactory conveyor employing a tilting support means is disclosed in the co-pending application of Richard L. Speaker et al. which was filed Apr. 10, 1972 and bears Ser. No. 242,330 and which is assigned to the same assignee as this application. As disclosed in such system, a series of individual load supporting units are interconnected for continuous and cyclical movement past a loading station. Keyed control means provide for actuating of the loads units to discharge a load at selective locations, for example, as shown in U.S. Pat. No. 3,782,531. To properly load such systems, particularly for very high speed sorting, an induction loading device is normally employed which will automatically deposit a load upon a predetermined interrelated load support unit such that the keying of such a unit provides for proper destination of the load. The induction loading station normally provides for automatic timed transfer of the loads onto the appropriate tray structure with the operator providing keying of the conveying sorter for each load. A plurality of the induction unit will normally be provided for any single sorting mechanism with the induction loader adapted to load and key predetermined spaced trays or load support units. In order to insure proper operation of these systems, the loader must, of course, operate not only in predetermined timed relationship to the sorter, but must operate to reliably transfer the load to the appropriate support unit. For example, in a retail department store type operation, various soft goods must be automatically sorted along with other small packages and parcels. Similarly, in the Post Office distribution systems, automatic sorters are now relatively widely employed by which mail sacks, parcels and the like are automatically sorted in accordance with predetermined destination. Articles or packages employed in such installation, particularly in general retail merchandising, have widely different shapes and flexibility from relatively thin, flat shapes to rectangular or square box-like members.

Although various high speed sorting rotary loaders have been suggested in order to provide reliable and repeatable loading characteristics, they have generally employed relatively large, complicated mechanisms. Although they produce desired reliability in loading characteristics, they do introduce a significant cost. The complexity of the system, of course, directly contributes to the cost and may, further, contribute to maintenance time and expense. In addition, many of them demand a relatively large amount of space which in some instances may be at least undesirable, if not acceptable.

Although various induction loading devices have been developed, a reliable and relatively compact induction loader is particularly adapted for warehouse distribution systems and the like where various soft and hard packages are encountered.

SUMMARY OF THE PRESENT INVENTION

The present invention is particularly directed to a centrifugal loader having a specially constructed support and transfer surface for receiving various types of soft and hard good loads and reliably discharging thereof onto a conveying means including high speed sorting devices. Generally, in accordance with the present invention, the centrifugal loader includes an inclined supporting surface extending upwardly from the periphery and extending circumferentially from a vane wall. The load is dropped onto the general support surface, picked up by the trailing vane wall and rapidly moved between the receiving station and a circumferentially displaced discharge opening aligned with a receiving conveying means.

In accordance with a further aspect and teaching of the present invention, Applicant has found that a generally conical shape of the supporting surface advantageously includes a cone angle of a varying degree, with an inner loading angle uniquely related to the load characteristics and an outer angle related to the load transfer characteristics. For example, in a merchandise warehousing system, various articles and materials have different static friction indexes or characteristics. Applicant has found that soft good products, for example, will require a somewhat steeper angle than other products of a lower friction index. Applicant has found that an inner cone angle of about 30° and an outer discharge or transfer angle of about 20° produces a highly satisfactory induction loader for retail warehousing systems.

Generally, in accordance with the application of the present invention, the small parcels of soft or hard goods are loaded onto the turntable which is rotated at the same or some even multiple of the velocity of the receiving conveying sorter. The rotational forces and the special inclined configuration is such that the loads slide into engagement with the vane wall and outwardly into engagement with an outer encircling guide wall. The guide wall is provided with a discharge opening such that when the centrifugal vane moves through that portion, the load is forced or thrown outwardly, as a result of centrifugal forces, onto the receiving sorter conveying means. Applicant has found that the invention provides a reliable loader which is relatively low in cost, has a minimum complexity and relatively minimal space requirements.

Applicant has further discovered that the rotary loader when loaded perpendicular to the direction of rotation provides optimum, dependably indexing of the load with respect to the pick-up vane.

For optimum results, the pick-up vane wall is formed as a perpendicular or vertical surface to insure a positive pick-up of the load and discharge thereof. Although the vane wall can be angularly oriented, there is a tendency, particularly with an oblique angle for the load to move up the surface with a variation in the discharge time.

In accordance with a further aspect of the present invention, particularly when there is any possibility of encountering relatively flat plate-like loads, a back diverting or stop wall is preferably provided to the outer side of the receiving conveyor.

In accordance with a further aspect of the present invention where the operating personnel may be located close to the loader under operating conditions, a special lead-in loading wall portion may preferably be provided for purposes of safety. In many installations, the loader is located in essentially an inaccessible location and the induction feed means may be located to directly drop the loads onto the centrifugal loader.

The present invention provides a relatively simple, low cost centrifugal loader which is readily adapted to a substantial number of sorting application including those encountered in Post Office installations, mail order and general retail merchandising establishments and the like.

BRIEF DESCRIPTION OF DRAWINGS

The drawings furnished herewith illustrate a preferred construction of the present invention in which the above advantages and features are clearly disclosed as well as others which will be readily understood from the following description:

In the drawing:

FIG. 1 is a plan diagrammatic view of a load sorting system incorporating a preferred embodiment of a centrifugal loader in accordance with the teaching of the present invention;

FIG. 2 is a pictorial view of the centrifugal loader;

FIG. 3 is a side elevational view of the loader shown in FIG. 2 with parts broken away and sectioned to show details of construction; and FIG. 4 is a fragmentary elevational view of the loader shown in FIGS. 2 and 3 and more fully showing the relationship with respect to the receiving conveying means as shown in FIG. 1.

DESCRIPTION OF THE ILLUSTRATED EMBODIMENT

Referring to the drawing and particularly in FIG. 1, the present invention is shown applied as part of a sorting system wherein a plurality of loads such as individual packages or articles 1 and 1a are moved from a loading station 2 to one or more receiving means 3 by proper automated activation of a conveying sorter 4. In a mail order merchandising house both soft and hard goods must be sorted. The soft goods may be clothing in the form of flat flexible packages 1 while other packaged articles may be small box-like loads 1a such as encountered in general merchandising operations. The articles 1 and 1a are received in random order on a suitable incoming conveying unit to a keying station 5 at loading station 2. A centrifugal induction loader 6 which particularly forms an embodiment of the present invention is located at the loading station 2 for transfer of the randomly received load 1 from the keying station to sorter 4 for delivery to predetermined receiving means 3. The incoming conveying unit 7 may be any suitable mechanism which will provide feeding of the articles 1 in proper sequence. Similarly, the sorter 4 may be of any suitable conveying means which is adapted to coded control for selective discharge to a selected one of the unloading stations 3 for sorting of the articles into related groups. In accordance with a practical application of the present invention, the sorter 4 preferably includes a series of split tray units 8 such as disclosed in the previously referred to co-pending application of applicants. Thus, the illustrated sorting device is shown as a unit including a plurality of split tray units 8, each of which is adapted to receive a load 1 or 1a. Each tray unit 8 includes a latch unit 9 which, when released, allows the corresponding tray half to drop and discharge the load 1. A memory control unit 10 is provided at the loading station 2 with a manual input keyboard for manual introduction of coded information into a memory control, not shown, which operates in timed relation to the operation of the rotary loader 6 and sorter 4 to automatically set a trip unit 11 and drop the loaded tray unit 8 when aligned with an appropriate receiving station 3, for example, as shown in the previously referred to application of Richard L. Speaker et al, Ser. No. 242,330. The loads 1 and 1a are introduced onto a rotary loader 6 via a chute 12 and discharged or transferred to the sorter 4 at a generally diametrically opposite location of the rotary loader 6. In the illustrated embodiment of the invention sorter 4 and particularly tray units 8 pass beneath the periphery of the loader 6 and the loads are discharged by dropping onto the center of the appropriate tray unit 8.

As noted previously, the centrifugal loader of the present invention is uniquely constructed with a combined spiral and conical shape or configuration to provide for reliable transfer of various loads and particularly to adapt the unit to applications in mass merchandise retail warehousing, Post Office sack sorting and the like.

Generally, the illustrated embodiment of the centrifugal loader 6 in accordance with the teaching of the present invention is a cylindrical unit having an outer generally circular and vertical guide wall 13 within which a special spiral conical rotor 14 is mounted. The articles are introduced onto the rotor 14 from the incoming discharge chute 12 which extend radially outwardly and upwardly from immediately above the rotor to an incoming feed conveyor 7. The rotor 14 has an outer diameter essentially corresponding to wall 13, and in the illustrated embodiment, includes a pair of generally spiral transfer surfaces 15 and 16 with paddle or vane walls 17 and 18 at the upstream end of the respective surfaces. The surfaces are formed with a smooth, low friction exterior such that the loads slip or slide thereon. The load is deposited on a transfer surface 15 and the rotation of the rotor causes the pick-up by the trailing vane wall 17 or 18 as a result of the rotation of the rotor 14.

The wall 13, in circumferentially spaced relation to the induction or loading chute 12, is removed or otherwise provided with an opening 19. The rotation of the rotor 14 results in the outward movement of the load 1 to the guide wall 13 and then outwardly through the opening 19 to the aligned receiving tray unit 8.

The circumference of the wall 13 and rotor 14 is selected to be an integral member of tray lengths such that the synchronized rotation of the rotor 14 and conveyor 4 provides for sequential alignment of the vanes 17 and 18 with the opening 19 in synchronism with alignment of pre-selected spaced tray units 8 as long as such synchronized movement of the rotor 14 and the tray units 8 is maintained. The synchronization may be provided by any suitable system connecting the drives 20 and 21 and therefore shown in block diagram at 22. A particularly satisfactory system is shown in the co-pending application of John Bonow entitled "POSITION SYNCHRONIZING APPARATUS", filed on the Feb. 10, 1975, bearing Ser. No. 548,562, and assigned to the same assignee as this application.

The rotor 14 may be formed with a single transfer surface or a greater plurality of surfaces and has been shown with the two surfaces 15 and 16 for purposes of illustration. Further, each of the illustrated surfaces 15 and 16 is similarly constructed and the surface 15 will be particularly described with the corresponding portions of surface 16 identified by corresponding primed numbers for simplicity of explanation. Generally, the system is synchronized to align the vane 17 with the back or trailing edge 23 of a tray unit 8. In addition, the load 1 will be loaded forwardly of the vane as shown for parcel 1 and vane 18. As a result of the speed differential, the load 1 will slip on the low friction turntable or rotor 14 until the vane 18 actually picks up the load 1 to form a vertical transfer surface which carries the load around the guide wall 13 to the discharge opening 19.

A back wall 24 is located to the opposite side of the sorter 4 in opposed relation to the opening 19 to prevent the load 1 from moving across and from the sorter, as more fully developed hereinafter.

More particularly, the rotor 14 includes a generally central cylindrical hub portion 25 having the side wall thereof reliefed slightly from the top downwardly to the spiral transfer surface 15. The vane 17 projects radially outwardly as an essentially vertical wall which extends outwardly from the inner cylindrical hub portion 25 to the outermost edge of the rotor 14 and thus terminates in close spaced relationship to the cylindrical guide wall 13.

The rotor 14 is also formed with an outer depending wall or skirt portion 26 integrally formed with the outer edge of the spiral transfer surface 15.

The spiral transfer surface 15 extends circumferentially forwardly in the direction of rotation from the vane wall 17 and includes an inner first radially inclined portion 27 having a first angle as at 28 and merging with a radially outer inclined portion 29 of a second and lesser angle as at 30 for effective lateral transfer of the load 1 from rotor 14 to the tray unit 8.

As most clearly illustrated in FIGS. 3 and 4, the inner inclined portion 27 in the illustrated embodiment defines an included angle 28 with the horizontal vane of essentially 30 degrees and extends as a continuous spiral surface from the first vane 17 to the second vane 18. The first inclined portion 27 extends radially from the center hub portion 25 for approximately two-thirds the radial length of the rotor transfer surface 15 and merges with the outer peripheral transfer inclined portion 29. In the illustrated embodiment of the invention, an included angle 30 of 20° is shown. This angular relationship has been found to provide highly satisfactory results in a mail order merchandise warehouse system.

The transfer wall terminates in the outer depending skirt wall 26 which extends vertically downwardly. The outer skirt wall 26 and, thus, the outer edge of the transfer wall 15 is closely spaced with respect to the outer guide wall 13 to minimize the danger of jamming of a load therebetween. If desired, a suitable felt or other flexible closure member, not shown, could, of course, be located to completely eliminate the gap between the rotor 14 and the guide wall 13.

In a highly satisfactory practical construction of the present invention, the rotor 14 was formed of a plastic molded construction with suitable fibreglass reinforcing and the like. The transfer surface 15 is a single, continuous smooth surface with hub portions 25 and the several walls integrally interconnected by smooth continuous junctures.

The guide wall 13, as previously noted, is generally a vertical planar wall which may be formed of a suitable molded plastic, sheet metal or the like with suitable reinforcement. The discharge opening 19 is formed by removal of a portion of the guide wall 13 to completely expose the rotor 14 and, particularly the transfer surfaces 15 and 16 and vanes 17 and 18 as they move into alignment with the opening.

The trailing edge 23a of the opening 19 which is first encountered by the load is formed as a vertical edge or wall portion.

The leading edge portion 31 of the discharge opening 19 is formed to define an inclined guide surface which extends from beneath the lower end of the rotor surface 15 or 16 upwardly to the top or upper end of the guide wall 13. The uppermost edge of wall 13 is slightly above the uppermost edge of the vanes 17 and 18 and maintains a continuous vertical wall from adjacent chute 12 to opening 19.

The centrifugal loader 6 is preferably mounted in overlying relationship to the sorter tray unit 8 such that the loads 1 and 1a moving from the discharge opening 19 are located generally centrally of the width of the aligned tray unit 8. The back wall 24 located to the opposite side of the conveyor and along the length of the loading station 2 prevents the loads from moving outwardly over and beyond the receiving tray unit 8.

The back wall 24 is particularly effective in connection with generally vertical riding parcels or loads, as shown in FIG. 4. As such a load 1a moves along the guide wall 13 through the discharge opening, the top will have a tendency to drop and turn downwardly and in the absence of the stop wall 24 could move over the opposite and outer side of the tray unit 8 completely. The back wall, thus, more fully insures proper loading of such parcels and the like, The induction chute 12 is located extending radially of the loader 6 and is preferably located immediately adjacent to the terminal end of the inclined portion 31 of the discharge opening 19. The load drops directly onto the rotor 14.

Further, particularly at high speeds, the method of loading the centrifugal loader has been found to significantly affect the overall operation. Generally, Applicant has found that it is desirable to locate the load initially adjacent to or toward the center of the rotor 14 rather than immediately adjacent to the outer edge of the transfer surface or against the guide wall. Generally, the chute 14, under continuous operation will deposit the load onto the aligned support surface 15 or 16 in downstream spaced relation to the vane 17 or 18. The low friction presented by the smooth surfaced rotor 14 allows the load to slip the supporting surface and slide downwardly to the guide wall 13 because of the centrifugal forces and angular orientation thereof. The centrifugal forces imparted on the load holds the load against the guide wall 13 and positively moves it outwardly through the discharge opening 19. The leading inclined portion of the wall opening 31 will function to prevent damage to any load which may be moved through the opening without complete movement onto an aligned tray unit.

Applicant has found that the illustrated embodiment of the invention provides a very effective means of loading fashion type merchandise onto the high speed sorting system and may be readily employed with any relatively small parcel system.

Although the illustrated embodiment of the invention provides an optimum construction, the angular relationship of the vane wall and the transfer surfaces may, of course, be widely varied to accommodate the various types of load structures and the like. Thus, as a practical matter, the vane angle can be changed slightly from the 90° or vertical position to either a negative or positive angle. For example, one might think that it would be desirable to provide an inclined vane surface such that a load dropping thereon would tend to move downwardly along the surface onto the transfer surface. However, Applicant has found that particularly with relatively high speed transfers such as required for high speed sorting conveyors, the load tends to move onto the inclinded vane with a resulting significant variation in the longitudinal position of the load onto the conveyor.

In accordance with the teaching of the present invention, the vane or pick-up means and inclined rotor means, including the inclined supporting surface configuration maintains reliable and continuous indexing of the load onto the vane or pick-up wall means and an outer guide means to insure its proper transfer from the centrifugal loader to the appropriately aligned tray unit. The spiral surface and the multiple angled surface is particularly a unique and optimum construction for proper location of the load where repeated and reliable discharge of loads is required. However, a rotary loader employing a single plane inclined supporting surface extending across the rotor and, thus, in the direction of rotation from the lower edge of a generally vertical vane wall has also been satisfactorily employed to load a conveying apparatus. In such apparatus, the vane wall was offset from the center and, thus, formed in a chordal plane through the rotor.

Further, although the spiral rotor structure of the illustrated embodiment is shown with a single pair of distinct angled portions, a greater plurality of planar portions may be employed or even a progressively varying angle surface can be employed within the teaching of the present invention.

In summary, the precise method of loading, speed, angular relationship of the surfaces and the like, may, of course, vary with the friction characteristic of the load being transferred, the required transfer times and the like. Such detail can be readily determined by ordinary conventional design considerations and will, of course, be readily attended to and solved by those skilled in the art.

The present invention, thus, provides a relatively simple and reliable compact centrifugal loader particularly adapted to automated high speed sorters.

Various modes of carrying out the invention are contemplated as being within the scope of the following claims, particularly pointing out and distinctly claiming the subject matter which is regarded as the invention.

I claim:

1. A rotary transfer apparatus comprising a rotary member for discharging of a load by centrifugal force and having a vertical axis of rotation and at least one generally vertical planar transfer surface extending outwardly radially of said axis and having a lower edge, said rotary member having at least one load supporting surface extending circumferentially from the lower edge of said transfer surface to form a generally horizontal load support, said supporting surface extending along the lower edge of the transfer surface and projecting upwardly and around said axis in the direction of rotation from the lower edge of said vertical transfer surface and inclined downwardly from the central portion of the rotary member to define a substantially spiral-conical configuration, an outer guide wall means mounted in close encirclement about the rotary member and having a discharge opening, and a drive means coupled to the rotary member for rotating of the rotary member about said vertical axis.

2. The transfer apparatus of claim 1 including a second supporting surface concentric of the first and second load supporting surfaces having a different cone angle radially of the rotary member.

3. The apparatus of claim 2 wherein said second load supporting surface is an outer peripherial conical portion of an angle smaller than said first load supporting surface.

4. The apparatus of claim 1 including a plurality of said vertical transfer surfaces and a corresponding plurality of said load supporting surfaces.

5. The transfer apparatus of claim 1 having loading means overlying the rotary member and dropping of a load on the load supporting structure with a projection radially of said rotary member and inwardly of the outer peripheral portion of the load supporting surface.

6. The apparatus of claim 1 including discharge means to control discharge from said rotary member to a selected peripherial portion, a movable receiving conveying means located to receive loads from said rotary member, and means to move said conveying means and said rotary member in synchronism to provide for transfer of loads to predetermined portions of said conveying means.

* * * * *